Feb. 26, 1935.  C. J. WEEKS  1,992,265
INTERNAL COMBUSTION ENGINE
Filed Nov. 14, 1927  2 Sheets-Sheet 1
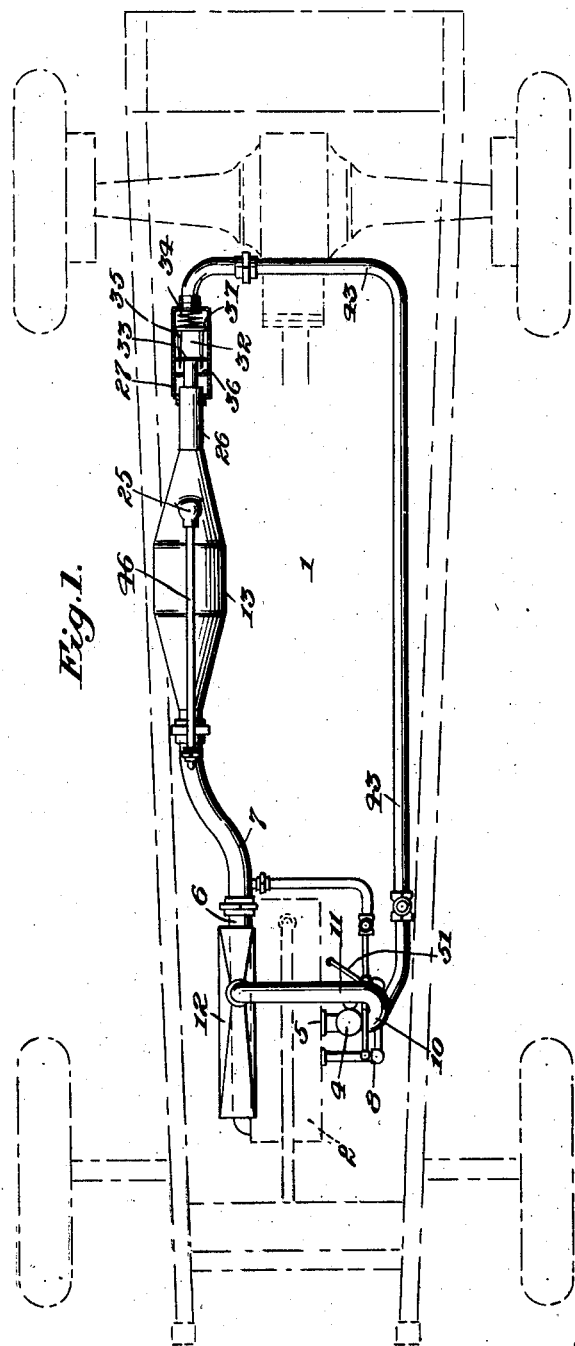
Inventor:
Charles J. Weeks,
Edmund H. Parry Att'y.

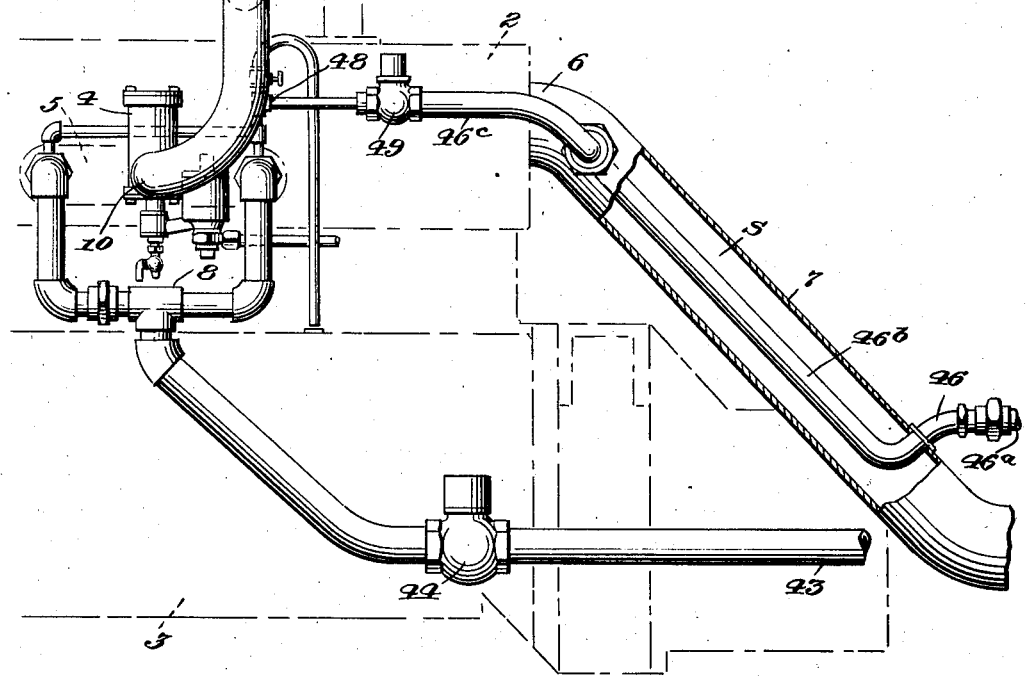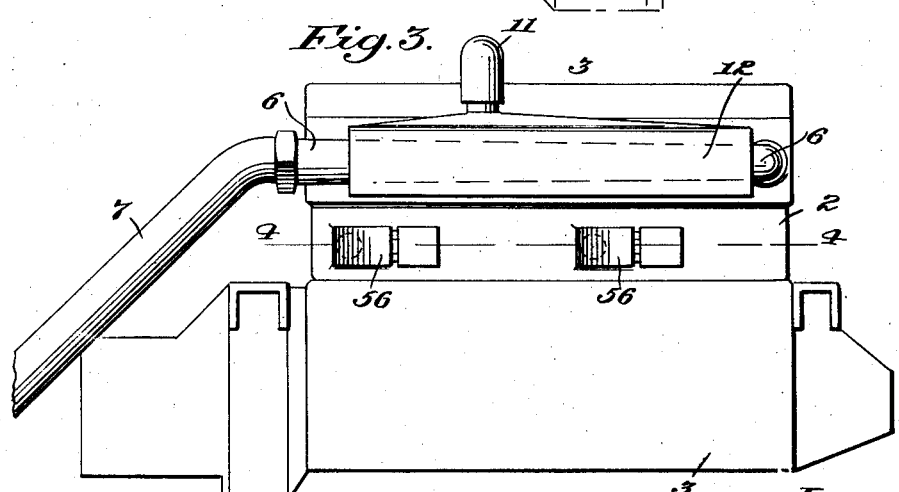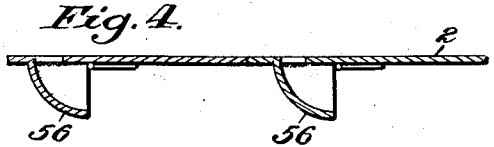

Patented Feb. 26, 1935

1,992,265

UNITED STATES PATENT OFFICE 1,992,265

INTERNAL COMBUSTION ENGINE

Charles J. Weeks, Jacksonville, Fla., assignor, by mesne assignments, to Motor Power, Inc., Atlanta, Ga., a corporation of Georgia Application November 14, 1927, Serial No. 233,169

43 Claims. (Cl. 123—119)

This invention primarily relates to internal combustion engines or motors; it more especially involves forming an explosive-charge therefor; and it contemplates, in this instance, a method and, also, the product resulting therefrom.

One of the fundamental objects of the invention is materially to economize use of the main supply of fuel (such as gasoline) and improve the combustibility of the components which constitute the explosive-charge for an engine of the general kind specified—and which may be of the four-cycle, two-cycle, or any other, type—and to accomplish this in such manner that appreciable economies are readily effected, efficiency of the engine promoted, increase in power accomplished, and carbonization within the engine prevented or, at least, reduced to a minimum. I thus provide for economically operating the motor at maximum efficiency per unit of fuel consumed.

Another fundamental object within the contemplation of my invention is to recover, treat, and utilize the power and/or heat units, etc.— usually discharged from such an engine—and effect integrating of these with the usual mixture supplied to the engine by an associated mixture-producing device—such as a carburetor—with a resultant explosive-charge possessing characteristics which greatly augment the effectiveness and efficiency of such a charge when exploded within the engine.

Another fundamental object is to intermingle and integrate a gaseous-mixture with gases carrying no appreciable amount of hydrogen but containing an increased volume of oxygen, the gases comprising, in part at least, the waste portions of the exploded charge—the unspent components of the exhaust—these being collected and intermingled with a fresh gaseous-mixture, the fuel-component of which is greatly reduced by reason of the fact that considerable fuel is derived from the combustibles of the returned gas.

Another fundamental object is to return to the engine-cylinders selected portions of the exhaust or unspent gases, these returned gases being mixed or integrated with other fuel to be introduced therein, the admixture thus formed being then drawn into the cylinders; this object including (in some instances) not only the mixing of the hot gases from the exhaust with vaporized fuel from the carbureter (say) but, also, from the associated crank-case.

Still another fundamental object is, in a novel manner, to treat the exhaust-gases to be reintroduced into the engine or motor, such that they are thereby rendered suitable as fuel, their combustibility materially increased, and their capacity to combine with other components of the explosive-charge improved.

Another object is, by utilizing the unspent gas from the exhaust and treating it in the unique manner herein disclosed and, then, admixing or integrating it with the gaseous-mixture from a carbureter (say), to decrease very materially the amount of (and, in consequence, economize in) fresh fuel which is supplied to the carbureter to run the engine.

Another important object is to collect the hot, unspent gases from the engine-exhaust and, then, in mixing them with a gaseous-mixture utilize more or less of the heat (inherent and/or added) to raise the temperature of that mixture with resultant material increase in its combustibility.

Another object is to proportion the fresh fuel, as such, to the unspent gases and to any air introduced to support combustion, thereby reducing the supply of the fresh fuel and adding to the volume of the working-explosive-charge, with resultant increase in its weight and temperature, which conditions themselves, cause it to draw less fresh fuel and, besides, the added unspent gases—preferably treated in transit—supplement it.

Another object is to provide an auxiliary combustion-product comprising exhaust-gases, some of which have been treated to effect a change in their characteristics, and which auxiliary product may, at times, also include selected fuel-constitutents recovered from the crank-case. This product thus functions not only as a fuel-component but, also, as a heating-medium to add heat to the gaseous-mixture.

Another object contemplates the cycling of the combustible components of the unspent gas of the exhaust in such manner that, by resubmitting the same in a more or less changed character and admixed with fresh fuel to the explosive action of the motor, they are eventually more or less entirely consumed, thus effecting a substantial decrease in the amount of fresh fuel required to meet the demands of the motor, with consequent material saving in cost of operation thereof.

Another object is to submit a selected portion of the exhaust-gas to treatment such that its mechanical and, perhaps, its chemical character and characteristics are changed; that is to say, the unconsumed products of combustion of the motor, or at least some of them, are directed through a zone of intense, flaming heat, and are thereby converted, with substantially no intermediate cooling or chilling.

Another object is selectively to segregate different portions of the exhaust-gas and mix them more or less with a fresh gaseous-mixture, at least one of the selected portions being subjected to a superheating or reheating treatment by and within the zone of the effective action of the flaming exhaust-gases from the motor; another selected portion untreated (so to speak) being also admixed with the superheated exhaust-gas and the gaseous-mixture, the temerature of the latter as well as of the untreated exhaust-gas being substantially increased (with consequent improvement in their combustibility) by the heat-exchange effected by the integrating operation.

Another object contemplates supplying the charge with fuel from the exhaust-gases and crank-case, advantage being taken of the heat existent in the gases to effect, during the integrating operation, a preheating of the incoming mixture, air to support combustion being drawn from the atmosphere.

Another object is to subject the exhaust-gases to a pressure-raising action preliminary to a selected portion thereof being superheated to change their character before intermingling with the fresh gaseous-fuel.

Another object is to promote, rather than to prevent, a predetermined degree of back-pressure, whereby cushioning of certain strokes of the pistons, and of other parts of the motor, is effected; in other words, I aim to utilize the presence of certain media of the explosive-charge that may be under pressure to develop more or less back-pressure on the motor and, in consequence, cushion its moving parts, any seeming loss incident to such back-pressure being compensated for by increased power in the motor due to the more powerful explosive-charge introduced thereinto.

Another object is to divide the exhaust-gases into a plurality of portions, columns, or bodies and—then or before—compress them to a predetermined degree to increase their pressure, they then being withdrawn, more or less selectively, one portion, while still under pressure, being then subjected to a superheating action to change its character mechanically—and, perhaps, chemically, while another portion, also under pressure but, preferably, in larger volume, is brought into a mixing or integrating relation with the gaseous-mixture and the superheated exhaust-gases and, also, in some instances, but not necessarily so, with selected contents withdrawn from the crank-case of the motor.

Another object is to produce a unique type of explosive-charge including, (1) a gaseous-mixture, one or more components of which is or are more or less preheated, (2) a superheated or reheated body of exhaust-gas which (preferably) is under a predetermined pressure, (3) a second body of exhaust-gas also (preferably) under pressure, and (4) selected portions of the contents of the engine crank-case: This charge has certain characteristics and attributes which, when exploded, tend to effect more or less complete combustion thereof and, in consequence, greater efficiency of the motor and economy in its operation.

The invention possesses other and further objects and features, all of which will be more or less self-evident and/or will be set forth in the following description:

In a companion application, filed November 14, 1927 Serial No. 233,170, I have disclosed a preferred and practical apparatus for practicing the method herein contemplated. It is to be understood, however, that any other appropriate construction may be employed which will effectuate the objects hereinabove outlined.

In the accompanying drawings, forming a part of the present disclosure, I have illustrated the major and essential components of the apparatus of my companion application in order that the method of my inventive-concept may be readily comprehended, and therein—

Fig. 1 is a view in plan of the main portions of an automobile-chassis, and showing various instrumentalities of my improved charge-forming structure which are utilized in the practice of my method;

Fig. 2 is a view in side elevation thereof—partly in section and, also, somewhat fragmentary—looking from the left side of the chassis as seen in Fig. 1;

Fig. 3 is a similar but even more fragmentary view of the opposite side;

Fig. 4 is a view in horizontal section, on the line 4—4, Fig. 3; and

Fig. 5 is a fragmentary view, on a somewhat larger scale, of the construction illustrated in Fig. 2.

*Motor and general supporting and adjunctive structures*

Referring to the drawings, the reference-character 1 is noted as designating, in general, the chassis of an automobile. On this is mounted, in the usual way, an internal combustion engine or motor 2, which may be of the usual type, having the customary crank-case 3. With the motor is operatively associated a mixture-producing device 4, in this instance shown as a carbureter.

It is also to be understood that my charge-forming method, as herein disclosed, may be equally well employed in conjunction with any appropriate type of internal combustion motor, mounted in any suitable type of vehicle, in a boat, on an aeroplane, etc., etc., or for the generation of power for any purpose.

The motor 2 is provided, as usual, with intake and exhaust passages (not shown), the former being in communication with an intake-manifold 5, and the latter with an exhaust-manifold 6, the latter continuing into an exhaust-conduit or pipe 7.

Associated and in communication with the manifold 5 is a gas-intake 8.

*Fuel and air supply structure*

The mixture-producing device, whatever its type, may be supplied with fuel—such as gasoline, other forms of hydrocarbon fuel, and even non-hydrocarbon fuel—from a fuel-tank 9, preferably located, as usual, at the rear of the chassis, and between it and the carbureter (if the latter is utilized to produce a gaseous-mixture for the motor) extends the customary pipe or gas-line (not shown).

The air, in this instance, is introduced into an intake 10 of the carbureter through a conduit 11 which, in turn, is connected to an air-heater or "stove" 12 that derives its heat in any appropriate manner, as from an inclosed section of the exhaust-manifold 6 of the engine.

The gaseous-mixture produced in and supplied from the carbureter is conducted into the intake-manifold or passage 5 of the engine, in the usual manner.

The intake and exhaust passages, manifolds, and conduits may be of usual (or any appropriate) type and form having capacity to supply adequate quantities of the explosive-mixture to the motor and to exhaust the products of the explosion therefrom.

Circulatory system

The intake and exhaust passages, manifolds and conduits of the motor constitute some of the components of what I herein, for the purposes of convenience and ready reference, designate a circulatory system, the function of which is to contribute toward cycling the exhaust-gases from the motor back to its combustion-chamber and there again subject it to explosive action of the motor. The other components of the system include a muffler, an exhaust-equalizer, and pressure-controlling devices, gas-conduits, and a superheater, and which I will now describe.

*Muffler.*—Preferably and as shown, the exhaust-manifold is (through the pipe 7) in operative communication with a gas-dividing and trapping-device 13 revealed (in this instance) in the nature (in part) of a muffler.

Within the muffler are baffles 18, 19, 20, and deflector-element 22, these constituting what I call a gas-trap, in that a certain portion of the exhaust-gases are momentarily trapped in the chamber whereupon more or less of a selected body thereof is divided from other portions and passes out of the muffler.

*Exhaust-equalizer and pressure controlling device.*—Extending from the rear end of the muffler 13 and in communication with the chamber 17 thereof is a short conduit 26 which, in turn, connects and is in communication with a cylindrical member 27 which, for purposes of identification, I may herein designate an "exhaust-equalizer and pressure-controlling device", since it contributes more or less to equalize the flow of exhaust-gases through the circulating system and, also, to control the pressure to which the gases are therein subjected, in a manner presently to be explained. This device is more particularly disclosed in my application Serial No. 233,170, filed November 14, 1927.

The member 27 houses what is, in form, a piston or diaphragm 31. This has reciprocatory movement in a chamber 32 located at one end of the casing and acts, in one direction, under the influence of a spring 34 within the chamber.

Projecting from the diaphragm 31 is a series of tapered valve-elements 35, each of which extends through and works in an aperture 36. In consequence, the element serves, when in one position, to open the aperture for the passage of exhaust-gas, etc., flowing through the device and, when in a different position, to close the same, the passage therethrough being graduated in accordance with the position of the element in the aperture.

While the disclosed controlling structure appears preferable, nevertheless any appropriate type of release-valve or device will suffice and may be utilized.

*Exhaust-gas conduits.*—By reason of the provision of the aforementioned gas-dividing and trapping-devices, a plurality of portions or bodies of exhaust-gases that have reached the muffler are more or less selectively created: One of these passes out of the muffler through a coupling 25, while the other portion passes from the muffler through the conduit 26 into the equalizer-device 27. In the device 27 the selected body is conducted into the chamber 32 and, according to the volume and pressure of such body, operates the diaphragm 31, either to cause it to close the apertures 36 in the partition 33, whereupon the gas passes around the periphery of the diaphragm, out of the chamber 32, and into an elongated conduit 43; or, if the diaphragm has been actuated so that the apertures 36 are more or less open, a certain part of the contents will escape into the atmosphere.

Leading out of the equalizer-device 27 is the aforementioned elongated gas-conduit 43 which extends to and is in operative communication with the gas-intake 8. Thus, it will be manifest that a certain portion of the exhaust-gas and unconsumed products of combustion which have been exhausted from the motor pass into the muffler and, thence, into the conduit which conducts them into the intake-manifold. There they will be mixed with the fresh gaseous-mixture supplied to the manifold by the mixture-producing device 4. By reason of their high temperature, these products will impart considerable heat to the mixture and, in addition, will supplement the explosive-mixture that is supplied to each of the combustion-chambers of the motor.

Intermediate the terminals of the conduit 43 is a controlling-device 44 which, preferably and in this instance, is a balanced valve operating under the influence of the suction of the motor—as developed back through the manifold to the valve —or under the influence of the pressure of the passing gases. That is to say, the valve, by the force of gravity, normally remains seated; but, when the motor is in action, its suction, or the pressure which it develops in the gases, lifts the valve-member more or less from its seat so that, at times, it may be said to float within the casing. By these means, the flow of the gases, etc., through the conduit 43 is automatically governed in exact accordance with the action and requirements of the motor. By reason of the character of the valve thus employed, and the light weight of the valve-member thereof, it is readily operated to permit a predetermined volume of the exhaust-gases to be conducted through the conduit 43 and admit them to the motor. This volume, however, varies at times to meet the working requirements of the motor, as already mentioned.

*Superheater.*—Leading from the coupling-member 25 on the muffler 13 is a gas-conduit 46, preferably of somewhat smaller capacity than the gas-conduit 43. The conduit 46 is, preferably and as shown, in three main sections 46$^a$, 46$^b$ and 46$^c$. The section 46$^a$ overlies a major portion of the muffler and a part of the exhaust-pipe and, as these instrumentalities retain considerable heat, they transmit such heat (or at least some of it) to the section 46$^a$ and, thus, this section becomes in effect a preheater of the contents of the conduit during their passage through that section.

The section 46$^b$ is disposed within a portion of the exhaust-pipe and is, thus, subject to the intense heat—estimated to be 750° to 1000° F.— of the flaming gas in the pipe, and which heat is especially effective on the preheated contents of the section 46$^b$. By reason of its position within the zone of the flaming gas, etc., and the fact that such gases, etc., are superheated or reheated, I have, for purposes of identification, herein designated this part of the structure a "superheater", marked it S, and described the action thereof as "superheating or reheating". In a companion application of mine, Serial No.

233,170, filed November 14, 1927 I have more particularly described and claimed this superheater structure.

Preferably and as shown, the section 46$^b$ is of a length nearly that of the conduit, and is disposed in that portion of the conduit wherein the products of explosion within the motor are still flaming and, thus, at the intense heat already specified.

Near the juncture of the pipe with the exhaust-manifold, the section 46$^b$ projects through the conduit and is there connected to the third section 46$^c$ which, in turn, is tapped, at 48, into the gas-intake 8. Thus, it will be understood that when a certain portion of the unspent gases is acted on within the gas-trap in the muffler, that portion is by the deflector 22 directed into the coupling-member 25, whence it passes through the section 46$^a$ and, as already explained, is therein more or less preheated; thence, it passes into the superheater S and is thereby superheated and changed in its constituents, character and characteristics; thence, it passes into the section 46$^c$ and, finally, into the gas-intake and intake-manifold, there to intermingle, more or less admix with, and integrate with the body of exhaust-gas which has been conducted thereto through the conduit 43 and, also, with the gaseous-mixture from the mixture-producing device, with the resultant formation of a unique type of explosive-charge for the motor.

As it is desirable to control the passage of the superheated or reheated body of exhaust-gases flowing through the conduit 46 and, thus, regulate the quantity thereof introduced into the intake-manifold, I have provided the conduit—preferably on the section 46$^c$—with a balanced-valve 49 of a construction somewhat like the valve 44, and functioning in a somewhat similar manner. It is influenced by the action of the motor, similar to the valve 44.

Pressure production

From the foregoing, it will be perceived that, in the particular manner of connecting up the muffler with the intake-manifold—through the conduits 43 and 46 and the adjunctive parts—I have provided what is, in practical effect, a closed system; that is to say, my circulatory system provides practically a closed passage for the stream of exhaust-gases from the motor, through the exhaust-manifold, conduit, and muffler and, thence, back to the motor through the conduits 43 and 46 and superheater S. As a result, the successive impulses or explosions of the motor and the consequent action of the exhaust-stroke thereof develops a pressure within the system which, by reason of the function of the muffler and its adjunctive equalizer 27, builds up a pressure in the gases themselves such that, while they are en route to the intake-manifold, they are maintained under such pressure even up to the time that they admix or integrate with other contents of the intake-manifold and, also, afterwards. It follows, therefore, that the system provides a medium for subjecting such gases to pressure and, also, for maintaining them under pressure, preferably until they reach the intake-manifold, or even beyond that point, if desirable.

It also will be noted, particularly, that the stream or portion of exhaust-gas which passes through and is acted on by the superheater S is under pressure when treated thereby. Thus, it will be recognized that at least one body or portion of the exhaust-gases exhausted from the motor is subjected to superheating treatment while under pressure, whereby the resultant thereof is unquestionably a type of gas which is quite unique. I believe I am the first, therefore, to propose handling exhaust-gases of an internal combustion engine in a manner that they cycle from, back to, and then again through, the motor—perhaps several times—and the first, also, to superheat such gases en route and, preferably, under pressure, such that their constituent character and mechanical and chemical characteristics are substantially changed, these results being due, to a greater or less extent, to the fact that the superheating is preferably effected while the gases are under pressure.

It is to be understood that the action of the equalizer 27 is such that a pressure of a predetermined degree—of twelve pounds per square inch, say—may be developed in the gases, building up pressure on the contents to the specified degree. If the pressure, however, exceeds the predetermined degree, the diaphragm and its valve-elements 35 move more or less to open the apertures 36, this action permitting escape of enough of the contents of the casing to allow the pressure to drop down to what the equalizer 27 has been set for. When sufficient of these contents have thus been liberated into the atmosphere to restore the (twelve-pound) pressure the diaphragm will act to close said apertures and, thus, the casing. In this way, there is an equalizing of the pressure within the system; hence, I designate this device an "equalizer".

Another desirable condition to be noted as a resultant of the circulatory-system is that of back-pressure on the motor. Ordinarily, this is regarded as undesirable in that it reduces the power of the motor; but, in my structure, inasmuch as sufficient additional power is developed in the motor, by reason of the utilization of treated exhaust-gases, etc., I thereby more than overcome any losses that would otherwise ensue, and I gain the decided advantage of effecting a cushioning on the parts of the motor, whereby vibration, noise, etc., are reduced to a minimum.

A further desirable condition resulting from the maintenance of a controlled pressure on the exhaust is the reduction of the vacuum in the intake manifold. In other words, where, in a closed circulatory system, a portion of the fuel is supplied to the intake manifold under pressure, and where there is, thus, a more or less constant back-pressure on the motor, it follows necessarily that the vacuum in the intake manifold is correspondingly reduced. Thus, there results a condition which I have described as "high pressure and low vacuum". This condition is that which provides the advantageous cushioning of the reciprocating parts of the motor and constitutes an important result of the use of my method.

It will be understood, also, that the action of the controlling or balanced valves 44 and 49 is such as to contribute toward maintaining this back-pressure, their functioning being such as to govern a predetermined quantity or volume of the gases to pass therethrough and, thus, as the gases are under pressure, the valves will, to a certain extent, be influenced by such pressure to open or close in accordance with what the working requirements of the motor and the system may demand.

Utilization of vaporous crank-case contents

In the practical operation of the structure already described, I have found it more or less advantageous to withdraw certain of the vaporous and heated contents of the crank-case, introduce them into the intake-manifold, and there admix or integrate them with the gaseous-mixture from the carbureter and with the exhaust-gases cycled thereinto by my circulatory-system. To that end, I provide a conduit 51 (Figs. 1 and 2) which has one extremity 52 disposed adjacent the upper end of a breather 53 which, as usual, communicates with the interior of the crank-case. The other end 54 of the conduit is, preferably and as shown, tapped into the exhaust-conduit 46 which, in turn, communicates with the intake-manifold. The end 52 of the conduit is so disposed in relation to the mouth of the breather that, due to the suction developed through it by the action of the motor, it will withdraw the fumes, gaseous constituents and warm air from the crank-case and, at the same time, will draw in fresh air (through the end 52) from the atmosphere in quantity to give to the withdrawn contents the characteristic of fuel of reasonably good combustibility.

At times, it is desirable to regulate the quantity of these withdrawn contents; hence, I provide a valve 55 on the conduit 51. This type of valve may also be utilized, if desirable, in the other conduits herein revealed.

By reason of the fact that, as shown in this instance, the selected crank-case contents are introduced into the conduit 46 which conducts the superheated exhaust-gases to the intake-manifold, those selected contents integrate therewith before entering the intake-manifold, in consequence of which they absorb a high degree of heat therefrom and, also, are probably changed in their character, by mechanical and/or chemical action or reaction resulting from the integrating functioning of the manifold.

Crank-case cooling device

To facilitate the withdrawal of certain of the vaporous contents of the crank-case by the construction already described, and to effect a cooling of the oil within the crank-case and the consequent maintenance of a relatively cool motor, I may, in some instances, provide the same with means for introducing air from the atmosphere into the crank-case. Preferably and as shown, this involves mounting one or more air-ducts 56 at the side of the motor above the crank-case, these communicating with the latter, and being in the path of the motor-fan so that, as the vehicle in which the motor is mounted moves forward, air is forced by either or both of these actions into the air-ducts 56 and, thence, into the oil-chamber of the crank-case, cooling the oil therein.

Operation

The operation and cooperation of the various components of the system, aforementioned, and its adjunctive parts, will be more or less manifest from the foregoing. Assuming that an explosion in the motor has occurred and that the products of that explosion, in the form of exhaust-gases, unconsumed solids, etc., have been discharged by the motor into its exhaust-passage 6 in the usual manner and, thence, into the exhaust-conduit 7, these exploded products will, for a considerable distance if not throughout the entire length of the conduit, be aflame and, thus, carry a very high percentage of heat-units—of a temperature approximately from 750° to 1000° F. This intense heat will necessarily greatly raise the temperature of the superheater S and thereby effect a treatment of the contents of the section 46$^b$. The action is that, not merely of heating, but of superheating; and the resultant of such superheating is the conversion of the gaseous and other contents into a different type of gas or product, the exact character and characteristics of which are not yet definitely known to me.

It may here be stated that, generally speaking, an explosive-charge introduced into the cylinder of an internal-combustion power-device, preliminary to the charge-combustion, comprises in the main atmospheric-air and hydrocarbon, the latter being usually in the form of vapor, the charge generally being produced by integrating the hydrocarbon and air contents as the air is drawn toward the cylinder in what is known as the suction-stroke of the cycle of operation. Now, after compression and ignition of the charge, certain known chemical reactions and changes take place by reason of the explosive action brought about by ignition of the integrated components. For instance, it is known that the carbon-content of the hydrocarbon and a portion of the oxygen-content of the air react into carbon dioxid ($CO_2$), while the hydrogen-content of the hydrocarbon reacts with the oxygen-content of the air to produce a form of $H_2O$, the nitrogen-content of the air being practically inactive. There are, of course, some minor components present in the hydrocarbon and air contents, and the explosion effects more or less change in these minor components.

Now, an analysis of the contents of the muffler of my system discloses the unquestionable fact that certain of the usual constituents of exhaust-gases found in mufflers, under similar working conditions, are eliminated entirely, while others are varied in their volume. The following comparative tabular analysis indicates this, the volume being expressed in percentage:

Usual muffler contents

| Ratio of air to gases: lbs. | Hydrogen | Methane | Carbon monoxid | Oxygen | Carbon dioxid |
|---|---|---|---|---|---|
| 13.5 | 1.06 | 0.3 | 3.7 | 0.7 | 12.8 |

Weeks' muffler contents

| 16.7 | 0 | 0 | 0.1 | 1.6 | 11.9 |

It will thus be noted that, in my muffler-contents, there is no hydrogen or methane; and that the volume of oxygen is substantially increased.

I am, of course, aware of the fact that it has heretofore been proposed to utilize the exhaust-gases of a motor as fuel and, also, to utilize the heat of the gases returned to the motor for re-use therein; but I know of no instance where such gases are subjected to the action of a stream of intensely hot gases and unspent products of combustion, as here proposed, to raise them to an exceedingly high temperature, amounting, in effect, to superheating, strictly speaking. The unconsumed products of combustion may be said to be "cooked" in the superheater, whereby they are thoroughly gasified. Just what the mechanical and/or chemical effect of the superheating on the gases is, I am not at present prepared to state, as already indicated.

By reason of the fact that the contents of the superheater are under pressure—twelve pounds to the square inch, say—the action of the superheater may amount to, or be in the nature of, "cracking". In other words, inasmuch as pressure and a relatively high heat are concomitants of gasoline "cracking", and as the contents of the superheater are—in part at least—unconsumed products of combustion that are developed from a fuel which, if of a hydrocarbon form, would lend themselves to such a "cracking" treatment, it would seem that, on known conditions and results, the volatility of the contents will have been augmented by such treatment. Be that as it may, the superheated body of exhaust-gases, etc., which pass through the superheater will necessarily have undergone a substantial change, so that when they enter the intake-manifold, they exist as a treated body, such that, both as a fuel and as a heating-medium, they will almost inevitably effect a change in the other contents of the manifold, the exact nature of which change I am also unable at present to state. Observed results, however, incline me to the belief that they supply to the combustion-chamber a character of explosive-charge which is in a highly volatile condition, practically dry, and of high efficiency. This results in a material decrease in the requirement of the motor for fresh fuel, as indicated by the fact that, in practical tests and under unquestionable conditions, the explosive-charge has been demonstrated to give a mileage, per pint of fuel—commercial gasoline—used, far in excess of anything heretofore attained under identical conditions, so far as now known to me. In other words, a car equipped with the structure herein disclosed has demonstrated in a practical way that, under usual running conditions of such a car, a heretofore unattainable mileage, for each gallon of fuel used, can be attained. The unquestionably unique results resulting from the system disclosed appear, therefore, to be due, in a large measure at least, to the treatment of the exhaust-gases, such treatment involving their being superheated while under pressure.

Resuming, now, the course of the outflowing products of the exploded charge: They will, after passing through the conduit 7, enter the muffler 13, which has a tendency to split the products up into the deflector-element 22 which directs them into the coupling 25, while other portions pass over and around that element and into the short conduit 26. By reason of the fact, already mentioned, that the circulatory-system is of a closed type, and permits the development of pressure in the exhaust-gases, it will be understood that the streams of the contents of the muffler which are released therefrom, either into the coupling 25, or into the conduit 26, are under pressure, and continue their respective courses under pressure. The chamber 17 of the muffler in which is mounted the deflector-element 22, and which I have herein designated a "gas-trap", effects a division of the exhaust-gases, which have entered the muffler, into two portions or streams, one of these (under pressure) flowing out of the chamber 17, through the coupling 25, and into the conduit 46; while the other stream (also under pressure) flows out of the chamber, through the conduit 26, and into the gas-equalizer 27, where it is again divided, more or less periodically. The major portion, however, passes through that device into the conduit 43, while a small quantity is discharged from the device into the atmosphere, according to the position of the valve-elements 35 in respect to the apertures 36 of the device.

The stream of gas which has passed into the conduit 43 eventually reaches the balanced-valve 44 which, by reason of its construction (as already described) permits the passage therethrough of the requisite volume of the contents of the conduit into the intake-manifold.

In the meantime, the stream of exhaust-gas which has passed from the muffler into the conduit 46 is conducted through the section 46ᵃ which imparts to it a certain amount of heat derived from its juxtaposition to the muffler and by which the temperature of the contents of that section may be more or less maintained. Following this step, the gas passes into the superheater S and is thereby treated in the manner and with the results already described, after which it is delivered into the intake-manifold and admixes or intermingles therein with the other body of the exhaust-gas which has been introduced into the manifold through the conduit 43.

While these operations are being performed, in connection with the two bodies of exhaust-gases, the mixture-producing device will have delivered to the intake-manifold a fresh supply of gaseous-fuel which admixes or intermingles with the two bodies of exhaust-gases and, moreover, receives therefrom a considerable amount of heat.

By reason of the fact that the integrated exhaust-gases which are utilized in this connection are in the nature of fuel, they, in consequence, themselves supply the motor with an explosive-charge of considerable volume  It is known that they are of such volume and character as very materially to reduce the volume of fresh fuel drawn from the carbureter, such that the specified high mileage, per gallon of gasoline, indicates that a relatively small quantity of gasoline is drawn through the carbureter by the motor to meet its requirements for fresh fuel.

It will be readily understood and appreciated that the introduction into the intake manifold of a large quantity of inert substances, such as unconsumed products of combustion, result in a dilution of the charge, thereby permitting higher compression in the cylinders. While in the foregoing description I have referred particularly to the introduction into the intake manifold of such inert substances from the exhaust after reheating or superheating the same, it will be understood that it is not necessary that these products be reheated but they may be introduced from any part of the exhaust system and in any condition with resultant dilution of the charge. Thus, higher compression in the cylinders is permitted and yet there is no danger of preignition.

While the conduits 43 and 46 and the carbureter are functioning to supply the intake-manifold with the components for the explosive-charge, certain portions of the contents of the crank-case—selected vaporous contents thereof—are, after being mixed with air from the atmosphere, conveyed by the conduit 51 and are eventually admixed or integrated with the contents of the manifold, have their temperature increased by reason of coming into contact with the hot and heated streams of exhaust-gases, and in this condition become a part of the explosive-charge. These vaporous contents from the crank-case may not change the character or characteristics of the other contents of the intake-manifold; but they apparently constitute a fuel which becomes a part of the explosive-charge and, thus, further reduce the draft on the carbureter for fresh fuel.

To what extent the exhaust-gases are reintroduced into the motor is not yet entirely known to me; that is to say, it has not yet been determined how many times these exhaust-gases pass through the circulatory-system; but, to whatever extent their character or characteristics require that they shall be reintroduced, before being released into the atmosphere, the circulatory-system provides for, and has the capacity of, cycling the gases therethrough, once or any number of times requisite. By reason of the treatment which certain portions of these gases receive in transit from the exhaust to the intake-manifold, and the probable consequent change in their character, it is believed that the explosive-charge—comprising whatever fresh gaseous mixture is supplied by the mixture-producing device, the two bodies of exhaust gases (one superheated or reheated and both under pressure), and the vaporous content of the crank-case when that particular part of the structure is utilized, results in a more perfect and complete combustion; hence, it may well be that the exhaust-gases are reintroduced into the motor but once. But if they still are below the condition of combustibility and require further treatment to make them so, the system which I have provided has the capacity, and can function, to cycle those gases through the system once or several times, for such further treatment preliminary to their being ignited in the motor.

It is a feature of my concept that I treat the fuel which is to form a constituent of the explosive-charge in such manner that it is physically modified, which facilitates subsequent vaporization and adds explosive qualities to the gaseous vapor. It also presumably changes or modifies the chemical composition of the fuel, itself, as by chemical reaction taking place between the fresh fuel and the superheated gas. In other words, I appear to generate a unique type of gas, the nature of which is, in part, indicated by the above analysis. There may be, and perhaps are, molecular changes effected in the elements, or there may be dissociation thereof, or there may be a new and/or different combination of such elements thereby produced, so that a new substance, or new substances, not heretofore utilized or known, may be the resultant of the action and functioning of the structure.

As aforementioned, the physical qualities of the fuel—comprising the integrated components specified—appear to be due to reaction between or interaction of the different types of such gases brought together in the intake-manifold. The possible, and perhaps probable, effect is that the fuel has its specific gravity materially lowered, making the same exceedingly volatile and highly explosive without deposit or even formation of carbon, so far as can be detected. I am satisfied that chemical as well as physical changes are effected by this operation.

The mingling of the hot and/or superheated gases with the gaseous-mixture, in addition to supplying a fuel-component to the explosive charge—reducing the quantity of fuel drawn through the carbureter—acts beneficially on the charge; first, heating it and increasing its volatility and combustibility; secondly, by effecting a more intimate mixing and/or integrating of the contents of the manifold; third, by converting into a gas, or more vaporized condition, the fuel drawn in through the carbureter; and, fourthly, by effecting chemical reactions as well as physical changes.

The treatment herein described of the unconsumed products of combustion has the effect of facilitating the integrating (in the intake-manifold) of the stream of exhaust-gases (of one density and temperature) and the gaseous-mixture (of a different density and temperature) from the carbureter, and tends to effect greater expansion of the column of the fuel-gas and a change in its character; hence, a highly developed and integrated column of an explosive-charge is introduced into the combustion-chamber.

In the absence of recognizable conditions and known facts about the actions of certain of the components of my concept and the consequent lack of ascertainable information regarding certain of the results of the functioning of those components, I have herein set forth certain theories which I believe to be correct, but which I reserve the right to correct or change, if need be, as the result of further tests and analyses. For instance, I have herein described the results of subjecting certain portions of the exhaust-gases to superheating or reheating treatment as involving something in the nature of "cooking" and "cracking". I have also referred to the fact that the action of the superheating may effect mechanical and/or chemical changes in the material being superheated. If there be such mechanical and/or chemical change effected, it would appear to follow that any material thus treated would, upon intermingling, combining or integrating with the other constituents of the contents of the intake-manifold, undergo further change, which may involve a mechanical and/or chemical change, so that the resultant explosive-charge, as introduced into the combustion-chamber of the motor, would, for that reason also, be of a unique type. It is known, in any event, that the contents of the muffler, as shown by analyses thereof, are different from the usual contents of a motor associated with a motor that is operated under similar conditions.

But whether the theories herein set forth are correct, or subject to change as the result of further developments, it may now be stated that certain basic principles and features of my concept have, in practical use thereof, demonstrated that my circulatory-system, and/or certain components thereof, function to produce a more efficient action of the motor, with consequent increased development of power therein and, likewise, with consequent economy in the operation of the same. In addition, by reason of the increased power of the motor, I find it of advantage, in developing the pressure within the system, to subject the exhaust-gases to an appreciable degree of pressure and then utilize the resultant back-pressure on the motor for the purpose of eliminating vibration thereof, etc. It will be understood, of course, that while I elect to subject the gases to a twelve-pound pressure, usually, nevertheless, the circulatory-system, with the controls thereof, permit the cycling of the materials passing through the system at a higher or lower pressure. Moreover, the inherent back-pressure on the motor is not, perhaps, as high as the pressure on the material; but, in any event, it is not such as materially to affect the action of the motor; in fact, it is beneficial thereto and for the reasons stated.

In those instances known to me where it has heretofore been proposed to utilize the exhaust-gases of a motor, both as a fuel and as a heating-medium, by the reintroduction of the same to the motor, it has not been attempted, so far as I am aware, to handle and treat those gases in the manner herein disclosed and whereby the volume of fresh fuel required for the motor is so materially reduced as to be almost negligible, comparatively speaking: I therefore believe myself to be the first so to utilize exhaust-gases of a motor that that motor, mounted in an automobile, say, will power the same to a very much higher mileage than heretofore for each gallon of fuel used, such as gasoline of the type now to be purchased at any regular filling station.

To what extent any one component, alone, contributes to the result mentioned, I cannot definitely state; but practical tests have shown that superheating or reheating certain portions of the exhaust-gases under a predetermined degree of pressure, undoubtedly contributes in a very large measure to these results, that is, to increase the power of the motor, to decrease the quantity of fresh fuel required thereby, and to improve the general working conditions of the motor.

In some instances, and in some types of motor, it may be desirable to intensify the spark.

Where I have herein used the terms "exhaust-gases", "spent gas", and other similar expressions, I refer to and intend to comprehend those products which are the resultant of the explosion in the motor, not only of the gaseous-mixture introduced thereinto from the carbureter or other form of mixture-producing device associated with the motor but, also, of any and all components of the explosive-charge, however constituted, and involving not only fuel and unconsumed products of combustion but, also, any gases, vapors, or even solids that may be exhausted from the motor and which are capable of being recovered or collected and then conducted back to the combustion-chamber, one or more times. These terms, and any equivalent expressions, also refer to such gases and other components, whether in their normal condition as directly exhausted from the motor, or after being handled or treated in the manner herein defined as contemplated by my inventive-concept. Similarly, the term "exhausting" and like expressions comprehend, and are intended to refer to, the normal action of the motor in relinquishing, after each explosion of the charge, the above-defined products of the explosion.

While the terms "gaseous-mixture", "fresh gaseous-mixture", "fresh fuel", and similar expressions primarily comprehend the product of a carbureter or other mixture-producing device associated with the motor; nevertheless, these terms comprehend and are intended to refer to the components—or one or more of them—which are supplied to the motor through the mixture-producing device and in contradistinction to the aforementioned gaseous and vaporous exhaust-products and the contents of the crank-case; and thereby the usual types of fuel, such as gasoline, kerosene, alcohol and similar fuels, are contemplated.

Where I have herein employed the terms "crank-case contents", "vaporous components of the crank-case contents", and similar expressions, I intend those expressions, and other similar, terms to comprehend and refer to, first, those elements or products of the crank-case susceptible of being recovered or collected and withdrawn, by the suction-action of the motor or otherwise, and which are more or less in the nature of fuel, whether in vaporous or gaseous form; secondly, any portions of the explosive-charge, exploded or unexploded, which may have escaped from the combustion-chamber into the crank-case and which are useful as fuel for introduction into the combustion-chamber, or even as a lubricant capable of reintroduction and re-use in the motor; and, third, any air—either lubricant-laden or otherwise—which (either heated, cooled, dry or moist) is adapted to intermix with fuel and support combustion in the combustion-chamber of the motor.

The terms "flaming gases", "flaming elements" and similar expressions used in conjunction with the current of products exhausted from the motor as the resultant of the explosion of a charge, comprehend and are intended to refer to, the condition of those products as they exist immediately after the explosion of the charge and while still ignited.

The terms "combustible products", "components", "constituents", "materials", "elements", and similar and equivalent terms, as herein used, contemplate any product, gas, vapor or even solid, capable of being introduced into a motor and susceptible of combustibility when exploded.

The terms "combustion", and similar and equivalent terms, are intended to comprehend the action within the combustion-chamber of the explosion of the charge therein introduced, whether such charge includes merely the aforementioned gaseous-mixture, or an admixture therewith of other components, and which produces, in complete or incomplete form, the above-defined exhaust-gases.

The terms "mixing", "admixing", "mingling", "comingling", "intermingling", "integrating", etc., comprehend and are intended to refer to the bringing together, in the intake-manifold, or other point adjacent the combustion-chamber of the engine, of the above-defined gaseous-mixture and/or exhaust-gases and/or crank-case contents, and/or air from the atmosphere or from any other source, and which action may involve either a mechanical and/or chemical combination or association of components to constitute the charge preliminary to its introduction into the motor.

The expressions "discharging to the atmosphere", "release into the atmosphere", and similar terms, are intended to comprehend and refer not only to the usual operations of a motor to relinquish to the atmosphere certain of the products of the explosion of the motor but, also, the escaping from any portion of the exhaust-system of predetermined quantities of consumed or unconsumed products of combustion.

The term "mixture-producing device", as herein used, is intended to comprehend and refer to a carbureter, to an atomizer, or to any other suitable instrumentality or structure for forming or producing an explosive composition adapted to be introduced into a motor as an explosive-charge.

The terms "segregating", "collecting", "dividing", "recovering", and similar expressions, as herein used, are intended to comprehend and refer to the handling of the products of combustion, either in the exhaust-system of the motor or in those conduits herein described as extending from the exhaust-system and communicating with the intake-manifold as well as any conduit connecting the crank-case with the intake-manifold, and whereby gaseous, vaporous, and other forms of materials and elements which are to constitute components of the explosive-charge are recovered or separated into streams, currents, bodies or portions for individual or other treatment en route to the intake-manifold.

The term "circulatory-system", as herein employed, comprehends and is intended to refer, primarily, to conducting the above-defined exhaust-gases, crank-case contents, etc., from and back to the combustion-chamber of the motor, and whereby the procedure of circulation is utilized to introduce or reintroduce the products of combustion, etc., into the intake-manifold to be there mingled with other components of the explosive-charge; this circulatory feature involving what is, to all practical purposes, a closed system whereby such circulation and/or re-circulation is facilitated or accomplished.

The term "cycling", as herein employed, is a feature of, and an action incident to, the provision of the circulatory-system just defined, and involves conducting or reintroducing the products of the explosion in the combustion-chamber through the system once, or as many times as may be required to effect complete combustion of the charge.

The term "superheating" and similar expressions, as herein employed, are intended to comprehend and refer to a treatment of certain streams, bodies, or portions of the exhaust-gas while in transit from the exhaust-system to the intake-manifold and whereby the gas, or certain of its components, are subjected to an intense heat, such that their temperature is materially raised above that which they ordinarily would possess when they reached the muffler, and whereby a substantial change in their character and/or their characteristics is effected, such change involving either a mechanical or chemical action or reaction, whereby their combustibility is substantially improved and, also, an additional amount of heat added thereto, this heat to be imparted to other materials introduced therewith in the intake-manifold. In connection with this action, utilized to superheat the exhaust-gases, I have herein used the term "cracking" by which term I mean to define the action of subjecting certain hydrocarbon materials, etc., to a high temperature while under pressure, this treatment more or less simulating the well-known gasoline-cracking operation now extensively practiced in connection with hydrocarbons.

The terms "pressure", "pressure-producing", and similar expressions, as herein used, comprehend and refer to the treatment of certain materials in the aforementioned circulatory-system whereby those materials are subjected to pressure, as produced either by the impulses of the motor through the system by action thereof, or by any other means whereby the materials within the system, or introduced thereinto from any source, have their pressure raised above normal and which, in this instance, is usually and preferably a selected pressure. The selected or predetermined degree of such pressure is accomplished with a varying degree by the action of the muffler and gas-equalizer operating in conjunction with the motor and the circulatory-system.

The term "back-pressure" as herein employed, and any similar or equivalent expression, comprehends and is intended to refer to the resultant of the impulses or suction of the motor whereby a cushioning effect is produced within the system and motor, and which is, in part at least, in consequence of subjecting the contents of the system to pressure by the pressure-producing instrumentalities referred to, and which back-pressure is utilized to advantage, in this instance, to cushion certain moving parts of the motor and thereby reduce vibration, improve the operation of the motor, etc.

What I claim is:

1. The method of preparing an explosive-mixture for combustion into heat and power units, which consists in charging a moving stream of gaseous mixture with a stream of exhaust gas and, also, with a stream of reheated unconsumed products of combustion, and integrating all of these streams.

2. The method of preparing an explosive-charge for combustion into heat and power units which consists in charging a moving stream of gaseous mixture with a stream of exhaust-gases, with a stream of the vaporous products, and with a stream of unconsumed products of combustion, and integrating all of these streams.

3. The method of producing an explosive-charge for internal combustion engines including the step of effecting reaction of exhaust-gases by subjecting the same to heat while under pressure and intermingling therewith a second body of exhaust-gases.

4. The method of producing an explosive-charge for internal combustion engines including the step of effecting reaction of exhaust-gases by subjecting the same to heat while under pressure and intermingling therewith selected portions of the gaseous and vaporous contents of an associated crank-case.

5. The method of producing an explosive-charge for internal combustion engines including the steps of effecting a reaction of exhaust-gases from the engine by subjecting the same to heat while under pressure and then intermingling therewith a second body of exhaust-gases and a gaseous mixture and selected portions of the gaseous and vaporous contents of an associated crank-case.

6. The method of producing an explosive-charge for internal combustion engines including the step of selectively segregating a portion of the exhaust-gases therefrom and treating the same to effect a mechanical and/or chemical change in the characteristics thereof by effecting a reaction of the same through subjecting the body to an appreciable degree of heat and a selected degree of pressure and intermingling therewith a second selected body of exhaust-gases.

7. The method of producing an explosive-charge for internal combustion engines including the step of selectively segregating a portion of the exhaust-gases therefrom and treating the same to effect a mechanical and/or chemical change in the characteristics thereof by effecting a reaction of the same through subjecting the body to an appreciable degree of heat and a selected degree of pressure and intermingling therewith a second selected body of exhaust-gases and a gaseous-mixture.

8. The method of producing an explosive-charge for internal combustion engines, including the step of effecting a reheating of a body of exhaust-gas resultant of a charge-explosion, such step involving the passing of the body in the presence of but out of contact with flaming gases to provide an explosive fuel-component.

9. The method of producing an explosive-charge for internal combustion engines, including the step of effecting a reheating of a body of exhaust-gas resultant of a charge-explosion, such step involving the passing of the body in the presence of flaming gases and simultaneously effecting an action on the gas-body in the nature of cracking to provide an explosive fuel-component.

10. The method of producing an explosive-charge for internal combustion engines, including the step of subjecting exhaust-gases to the action of a controlled degree of pressure and, then, to a reheating action, and, finally, mixing the resultant thereof with another gaseous-mixture.

11. The method of producing an explosive-charge for internal combustion engines, including the step of subjecting exhaust-gases from the engine to the action of a controlled degree of pressure and, then, to a reheating action and, finally, mixing the resultant thereof with crank-case vapors, gas and air, and a fresh gaseous-mixture.

12. The method of producing an explosive-charge for internal combustion engines, including the steps of trapping at least a substantial portion of the exhaust-gases exhausted from the engine, subjecting the same, while under a controlled degree of pressure, to the action of a relatively high degree of heat whereby at least certain of its constituents are converted into a combustible gas, and mixing the same with another body of gas including a circulating stream of normal exhaust-gases.

13. The method of producing an explosive-charge for internal combustion engines, including the steps of segregating a predetermined quantity of exhaust-gases exhausted from the engine, then returning the same in the presence of an enveloping stream of exhaust-gases to effect a reheating of the segregated portion thereof.

14. The method of treating the resultant of an explosion of a charge in an internal combustion engine, including the steps of dividing said resultant into separate portions, subjecting at least one of said portions to a reheating action to effect a substantial change in its character, and, then, remixing the portions.

15. The method of producing an explosive-charge for internal combustion engines having a substantially closed circulatory system for conducting fluids and gases to and from its combustion-chamber, which consists in passing exhaust-gases through a zone of exhaust-gases having a relatively high degree of temperature, then conducting the resultant thereof to a mixing point in the system, then exploding the charge resulting therefrom, then conducting the resulting exhaust-gases to the zone of relatively high temperature, and continuing this cycling action until such gases are discharged into the atmosphere.

16. The method of producing an explosive-charge for internal combustion engines, including the steps of withdrawing certain of the gaseous and/or vaporous contents of the crank-case of the engine; mixing the resulting withdrawn contents with a fresh gaseous-mixture, and intermingling the resultant thereof with a plurality of portions of exhaust-gases, at least one of which portions has been subjected to a reheating action to materially increase its temperature and thereby provide an explosive-fuel as well as a heating-medium and whereby the temperature of the intermingling elements is consequentially raised.

17. The method of mixing a gaseous-mixture, exhaust-gases, and crank-case contents for use as an explosive in an internal combustion engine, which includes heating the air-component of the mixture, withdrawing the combustible elements comprising vapors, fumes, air, and the like from the crank-case of the engine, adding air thereto, and mixing the same with the mixture, reheating exhaust-gases resulting from an explosion of a previous mixture, and intermingling the reheated gases with the mixture and crank-case elements.

18. The method of producing an explosive-charge for internal combustion engines, including the steps of trapping a portion of the exhaust-gases resulting from an explosion therein, subjecting the trapped gases to pressure and reheating actions to adapt them as an effective component of the charge, intermingling such gases both as a fuel and as a heating-medium with a gaseous body, and adding heat to the resultant thereof.

19. The method of producing an explosive-charge for internal combustion engines, including the steps of trapping a portion of the exhaust-gases resulting from an explosion therein, subjecting the trapped gases to pressure and reheating actions to adapt them as an effective component of the charge, intermingling such gases both as fuel and as a heating-medium with a gaseous-body including the product of an associated mixture-producing device, one of the components of said product being substantially preheated, and adding heat to the resultant of the intermingling step.

20. The method of producing an explosive-charge for internal combustion engines, which includes the steps of forming a fresh gaseous-mixture by mixing preheated air with fuel; subjecting a predetermined quantity of exhaust-gases to pressure; trapping a selected quantity of such gases under pressure and subjecting the same to a reheating treatment and thereby render at least certain of their constituents more highly combustible; conducting another portion of the exhaust-gases, also under pressure, to a selected mixing-point; admixing said two portions of exhaust-gases as fuel and heating-media with each other and with the fresh gaseous-mixture; increasing the temperature of the one portion by transferring thereto heat from the other; withdrawing certain of the contents of an associated crank-case and admixing the same with said gaseous-mixture and with both of said portions of exhaust-gases; introducing a body of air into the crank-case to facilitate such withdrawal and, also, to effect cooling of certain of the contents thereof; increasing the temperature of the mixture at said mixing-point by transferring thereto heat from the contents withdrawn from the crank-case; conducting the resultant of the admixing of said fresh gaseous-mixture, said two portions of exhaust-gases, and said crank-case contents into the combustion-chamber of the engine and there igniting the same; intensifying the action of associated spark-producing instrumentalities to facilitate combustion of the contents of the combustion-chamber; exhausting the exploded contents as exhaust-gases and the like from the chamber; passing said exhaust-gases through a reheating-chamber in a direction opposite to that of the flow of the trapped portion thereof, whereby the latter are by the former subjected to said reheating treatment; conducting the exhaust-gases through an associated circulating system and subjecting them en route to pressure and certain of them to reheating action; utilizing the suction-action of the engine to effect transfer of the contents of said system between certain selected points therein; utilizing the action of the engine also to produce a predetermined pressure within the system; cycling the gases back to and through the combustion and, certain of them, through the reheating-chamber; and periodically discharging selected quantities of exhaust-gases from said system.

21. The method of preparing an explosive-charge for combustion in heating and power units, which consists in charging a moving stream of gaseous combustible mixture generated from liquid fuel with a stream of reheated exhaust-gas, integrating both streams and supplying the resultant in heated condition to the units.

22. The method of producing an explosive-charge for internal combustion engines including the steps of effecting reaction of unmixed exhaust-gases by subjecting the same to a relatively high degree of heat and supplying the reaction product to an engine while in highly heated condition.

23. The method of producing an explosive-charge for internal combustion engines including the step of isolating exhaust-gases and effecting reaction of the isolated gases by subjecting the same to a relatively high degree of heat.

24. The method of producing an explosive-charge for an internal combustion engine including the steps of effecting a reaction of hot exhaust gases by building up and maintaining therein a controlled degree of pressure and supplying the reaction product directly to the engine.

25. The method of producing an explosive-charge for internal combustion engines including the step of effecting a reaction of exhaust-gases by subjecting the same simultaneously to a relatively high degree of heat and to a controlled degree of pressure.

26. The method of producing an explosive-charge for internal combustion engines including the step of effecting reaction of exhaust-gases by subjecting the same to heat while under pressure and thereafter intermingling therewith a gaseous mixture.

27. The method of producing an explosive-charge for internal combustion engines including the step of selectively segregating a portion of the exhaust-gases therefrom and treating the same to effect a mechanical and/or chemical change in the character and characteristics thereof by effecting a reaction of the same in the absence of other gases through subjecting the body to an appreciable degree of heat.

28. The method of producing an explosive-charge for an internal combustion engine including the step of selectively segregating a portion of the exhaust-gases therefrom and treating the same to effect a mechanical and/or chemical change in the characteristics thereof by effecting a reaction of the same through subjecting the body isolated from other gases to a selected degree of pressure and thereafter supplying the re-action product to the engine.

29. The method of producing an explosive-charge for internal combustion engines including the step of selectively segregating a portion of the exhaust-gases therefrom and treating the same to effect a mechanical and/or chemical change in the characteristics thereof by effecting a reaction of the same through subjecting the body to an appreciable degree of heat and a selected degree of pressure.

30. The method of producing an explosive-charge for internal combustion engines including the step of selectively treating a portion of the exhaust-gases therefrom and thereby effecting a chemical change in and a reaction of the same by subjecting the same to a predetermined degree of heat and pressure, and thereafter intermingling the same with a fresh gaseous mixture.

31. The method of producing an explosive-charge for internal combustion engines, including the step of isolating and reheating exhaust-gases resulting from the explosion of a previous charge to provide a highly combustible fuel.

32. The method of producing an explosive-charge for internal combustion engines, including the step of reheating exhaust-gases therefrom while in non-flaming condition by subjecting the same to the heat of exhaust-gases in still flaming condition to provide a highly combustible fuel.

33. The method of producing an explosive-charge for internal combustion engines, including the steps of trapping at least a substantial portion of the gases exhausted by an engine, subjecting the same, while under a controlled degree of pressure, to the action of a relatively high degree of heat whereby at least certain of its constituents are converted into a dry and readily combustible gas, and thereafter mixing the same with a stream of gaseous-mixture.

34. The method of producing an explosive-charge for internal combustion engines, including the steps of dividing the exhaust-gases resulting from an explosion into a plurality of portions; subjecting at least one of said portions to a reheating action to change its character; reuniting said portions and mixing said portions with fresh gaseous-fuel mixture; then exploding the resultant of such mixing; and, then, cycling the resultant of such explosion.

35. The method of producing an explosive-charge for internal combustion engines, including the steps of firing a gaseous-mixture, confining the unmixed exhaust-gases resulting therefrom and cycling said gases through a subsequent explosion under pressure inherent in the gases in their confined state, and controlling and maintaining the pressure of the gases at a selected level by providing for and permitting the intermittent escape during the course of the cycle of portions of the exhaust-gases.

36. The method of treating the resultant of explosion of gaseous-mixture in an internal combustion engine having a combustion chamber, including the step of isolating and cycling said resultant from and back to the chamber in a confined state and under pressure inherent in the resultant so as to obtain substantially complete combustion thereof under repeated explosion, and controlling and maintaining the pressure of the resultant at a selected level by providing for and permitting the intermittent escape during he course of the cycle of portions of the resultant.

37. The method of treating the resultant of explosion of gaseous-mixture in an internal combustion engine having a combustion chamber, including the step of cycling said resultant from and back to the chamber through a closed system and repeatedly exploding the same until substantially complete combustion thereof has been effected and periodically opening the closed system to the atmosphere.

38. The method of producing an explosive-charge for internal combustion engines, including the steps of trapping and isolating exhaust-gases, subjecting the isolated gases to a reheating action, thereafter mixing the same with fresh gaseous-mixture, exploding the same, and then cycling the resultant of the explosion until approximately substantially complete combustion of at least the greater portion thereof is effected, and, finally, discharging a segregated portion into the atmosphere.

39. The method of producing an explosive-charge for internal combustion engines, including the steps of withdrawing certain of the contents of the crank-case of the engine comprising any gaseous elements thereof, trapping and reheating exhaust-gases from the engine, mixing the reheated exhaust-gases and the gaseous elements from the crank-case with each other and with fresh fuel and air, exploding the mixture, and then cycling and re-exploding the resultant to effect approximately complete combustion of the same.

40. The method of producing an explosive-charge for internal combustion engines having intake and exhaust manifolds which includes building up a pressure in the exhaust-gases from the engine to a selected pressure level, maintaining the pressure at such level by controlling and allowing the escape of portions of the gases, and cycling the exhaust gases under said controlled pressure from the exhaust manifolds directly to the intake manifold.

41. The method of operating an internal combustion engine, utilizing the exhaust gases therefrom, which includes, creating a back pressure on the engine to cushion the reciprocating parts thereof and reducing the vacuum at the engine intake by confining and cycling the exhaust-gases from the exhaust system of the engine directly to the engine intake under pressure inherent in the gases, and controlling and maintaining the pressure of the gases at a selected level by discharging portions of the exhaust gases to the atmosphere when the pressure tends to exceed the selected level.

42. The method of supercharging internal combustion engines which comprises returning a portion of the exhaust gases from the engine to the combustion chamber under pressure derived directly from the exhaust pressure, and introducing fuel and oxygen under pressure into the returning exhaust gases.

43. The method of supercharging internal combustion engines which comprises permitting a portion only of the exhaust gases from an engine to escape, returning the remaining portion of such gases to the combustion chamber under a pressure determined by the rate of escapement of the gases.

CHARLES J. WEEKS.